P. RINK.
DISK SHARPENER.
APPLICATION FILED JUNE 15, 1920.
1,393,967.
Patented Oct. 18, 1921.
2 SHEETS—SHEET 1.
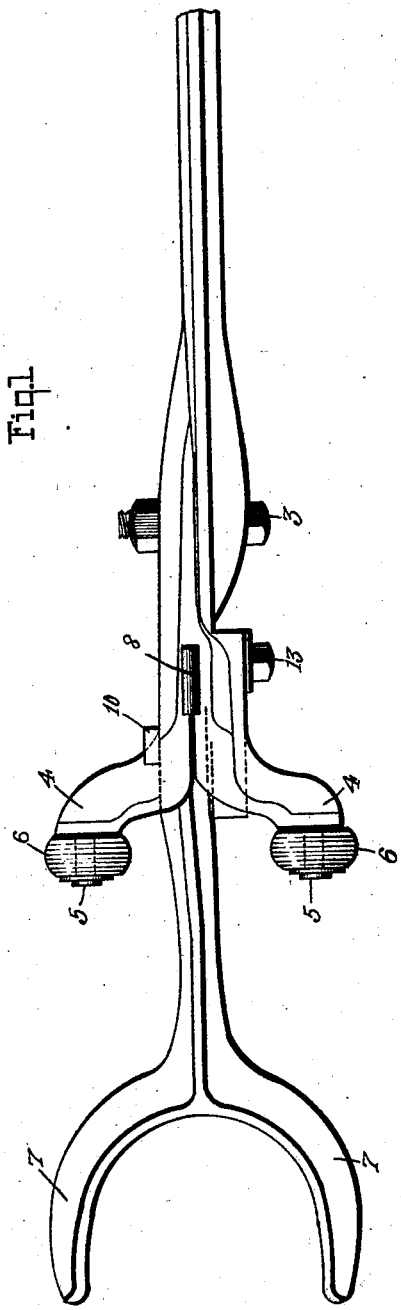
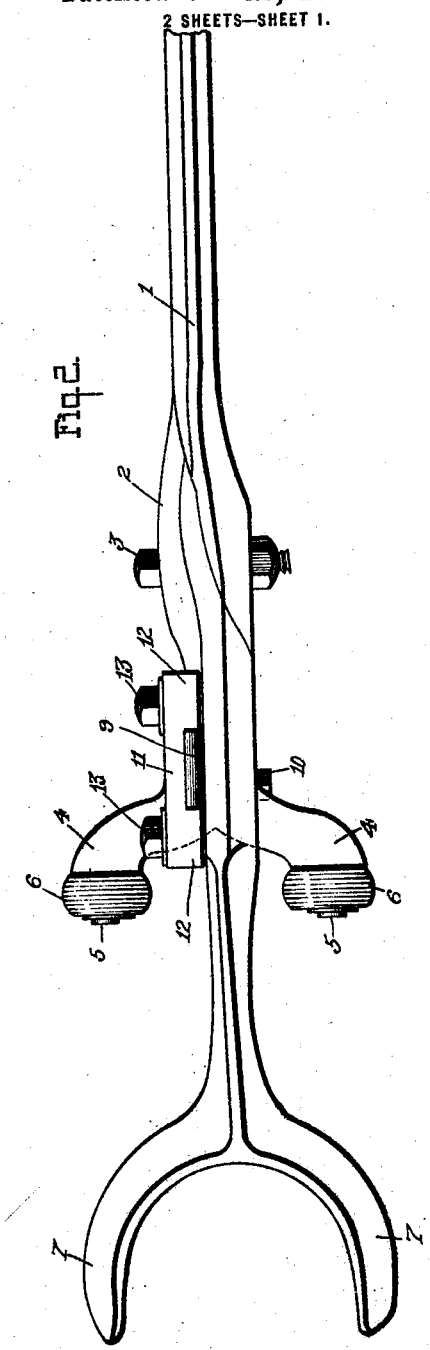
WITNESSES
C.A.Buchanan.
C.E.Trainor.
INVENTOR
P.Rink,
BY
ATTORNEYS

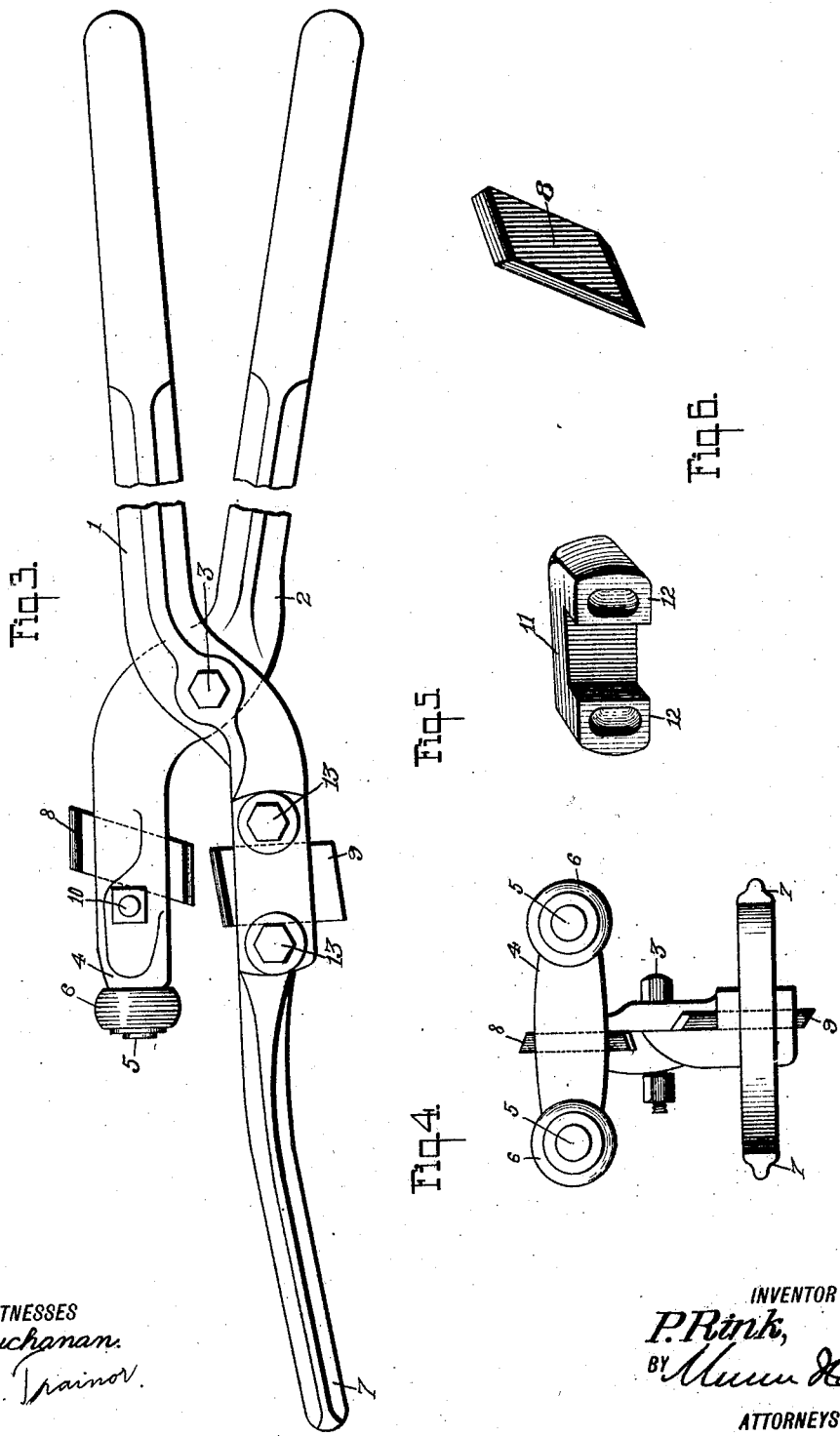

UNITED STATES PATENT OFFICE.

PETER RINK, OF CRESCO, IOWA.

DISK-SHARPENER.

1,393,967.  Specification of Letters Patent.  Patented Oct. 18, 1921.

Application filed June 15, 1920. Serial No. 389,072.

*To all whom it may concern:*

Be it known that I, PETER RINK, a citizen of the United States, and a resident of Cresco, in the county of Howard and State of Iowa, have invented certain new and useful Improvements in Disk-Sharpeners, of which the following is a specification.

My invention is an improvement in disk sharpeners, and has for its object to provide a device of the character specified, by means of which the disks of an implement, as for instance a harrow, cultivator, or the like may be easily sharpened while in place, without the necessity of removing the same, and without the necessity of any motive power other than that provided by the act of drawing the harrow or cultivator ahead with team or tractor.

In the drawings:

Figure 1 is a top plan view of the sharpener.

Fig. 2 is a bottom plan view.

Fig. 3 is a side view.

Fig. 4 is an end view.

Fig. 5 is a perspective view of one of the blade holders.

Fig. 6 is a perspective view of the blade.

In the present embodiment of the invention, two handle members 1 and 2 are provided, which are pivotally connected intermediate their ends as indicated at 3, and that end of each handle member remote from the grip is forked as shown in Figs. 1 and 2. The arms 4 of the fork at the handle member 2 carry journal pins 5, whose axes are parallel with each other, and rollers 6 are journaled on the pins. Thus the rollers rotate on parallel axes spaced apart from each other.

The arms 7 of the fork of the handle member 1 diverge from each other at a point farther removed from the pivotal connection 3 of the handle members then the point of divergence of the arms 4 of the fork of the handle member 2, and the said arms 7 are curved as shown, and are adapted to engage about the shaft upon which the disk to be sharpened is mounted.

Means is provided in connection with the handle members 1 and 2 for sharpening the disk edges, the said means being in the form of cutter blades 8 and 9, which are detachably connected with the handle members 1 and 2 on that side of the pivotal connection which is adjacent to the forks 4 and 7. The cutter blade 8 is secured to the handle member 2 by means of a bolt and nut 10, and the blade 9 is secured to the handle member 1 by the substantially U-shaped clip shown in Fig. 5. This clip comprises a body 11 adapted to extend transversely of the cutter blade, and arms 12 which have openings extending longitudinally of the arms, and transversely of the body, the said openings being elongated in cross section as shown, and having their long axes transverse to the body. The arms 12 fit on each side of the blade, and bolts 13 are passed through the clip, and through registering openings in the handle member, and they are engaged by the nuts on the opposite side of the handle member from the clip. Thus the blade may be adjusted toward and from the blade 8.

In use the arms 7 of the fork of the handle member 1 are engaged with the shaft, and the disk is rotated, with the rollers 6 in contact with the face of the disk remote from the fork arms 7, and with the cutter blades in contact with the opposite faces of the cutting edge of the disk. Referring to Fig. 3 it will be seen that the engaging edges of the blades incline with respect to each other, diverging from the pivotal connection, so that they will smoothly engage the beveled edges of the disk, and will scrape and cut away the metal to bring the edge of the disk to the desired degree of sharpness.

The rollers 6 by their engagement with the disk, cause the device to ride properly against the disk, and reduce friction. By means of the clip 11 the angle of the blade 9 may be changed. By loosening the nuts of the bolts 13, the bar 11 may be rocked laterally, and with it the blade 9. The opposite edges of the blades 8 and 9 are oppositely sharpened or beveled, so that they may be reversed. The reversal of the device permits the disks on both sides of the harrow to be sharpened. One blade sharpens one face of the edge, and the other blade removes the wire edge produced by the action of the first blade, leaving the disk in perfect condition.

It will be understood that the improved sharpener is stationary and the disks rotated, and all of the labor involved in sharpening the disk is furnished by the motive power of the implement in which the disk is used. The disks are in fact sharpened while the harrow or other implement is in use.

In the improved sharpener, one blade sharpens while the other blade removes the wire edge produced by the action of the first blade, thus leaving the edge in perfect condition.

I claim:

1. A device of the character specified, comprising a pair of crossed pivotally connected handle members, each of the said members being forked at one end, one fork being spaced apart farther from the pivotal connection than the other fork, and said first named fork being adapted to engage the supporting shaft of a series of disks at one face of one of the disks, rollers journaled on the arms of the other fork for engaging the opposite face of the said disk, and means supported by the handles between the forks and the pivotal connection for engaging and sharpening the opposite faces of the edge of the disk, said means comprising blades held on the handle members, said blades being adjustable relatively to the faces of the disk.

2. A device of the character specified, comprising a pair of crossed pivotally connected handle members, each of the said members being forked at one end, one fork being spaced apart farther from the pivotal connection than the other fork, and said first named fork being adapted to engage the supporting shaft of a series of disks, at one face of one of the disks, rollers journaled on the arms of the other fork for engaging the opposite face of the said disk, and means supported by the handles between the forks and the pivotal connection for engaging and sharpening the opposite faces of the edge of the disk, said means comprising blades held on the handle members.

3. A device of the character specified, comprising a pair of crossed pivotally connected handle members, each of the said members being forked at one end, one fork being spaced apart farther from the pivotal connection than the other fork, and said first named fork being adapted to engage the supporting shaft of a series of disks, at one face of one of the disks, rollers journaled on the arms of the other fork for engaging the opposite face of the said disk, and means supported by the handles between the forks and the pivotal connection for engaging and sharpening the opposite faces of the edge of the disk.

4. A device of the character specified, comprising a pair of crossed pivotally connected handle members, one of said members having at one end means for engaging the supporting shaft of a series of disks, the other handle member having rollers for engaging the opposite face of the disk being operated upon, said handle members carrying sharpening means for engaging each side of the edge of the disk, said means comprising cutter blades held on the handle members.

5. A device of the character specified, comprising a pair of crossed pivotally connected handle members, one of said members having at one end means for engaging the supporting shaft of a series of disks, the other handle member having rollers for engaging the opposite face of the disk being operated upon, said handle members carrying sharpening means for engaging each side of the edge of the disk.

6. A device of the character specified, comprising a pair of pivotally connected handle members, adapted to extend on opposite sides of a disk to be sharpened, one member carrying means for engaging the shaft carrying the disk, the other member carrying means for engaging the disk to steady the device, and both members carrying cutter blades for engaging edge of the disk.

7. A device of the character specified, comprising a pair of handle members pivotally connected and carrying blades for engaging the opposite faces of the edge of the disk to be sharpened, one of said handle members carrying means for engaging the shaft supporting the disk to be sharpened, for holding the blades at the proper distances with respect to the shaft, the other handle member carrying means for engaging the adjacent face of the disk to steady the support.

8. A device of the character specified, comprising a pair of handle members pivotally connected and carrying blades for simultaneously engaging the opposite faces of the edge of the disk to be sharpened, one of said handle members carrying means for engaging the shaft supporting the disk to be sharpened, for holding the blades at the proper distances with respect to the shaft.

9. A device of the character specified, comprising a pair of handle members pivotally connected and carrying blades for simultaneously engaging the opposite faces of the edge of the disk to be sharpened, one of said handle members carrying means for engaging the shaft supporting the disk to be sharpened.

10. A disk sharpener, comprising a cutter engageable with one face of the edge of the disk for sharpening the same, and a cutter simultaneously engageable with the other face of the edge of the disk for removing the wire edge incident to the sharpening action of the first-named cutter.

11. A disk sharpener of the character described comprising a pair of crossed pivotally connected members, a cutter carried by one of said members and engageable with one face of the edge of the disk to sharpen the same, and a cutter engageable with the other face of the edge of the disk for removing the wire edge incident to the sharpening action of the first-named cutter, the cutters having their cutting edges oppositely beveled whereby they may be reversed.

PETER RINK.